(12) United States Patent
Lee et al.

(10) Patent No.: US 12,104,954 B2
(45) Date of Patent: Oct. 1, 2024

(54) APPARATUS FOR DETECTING UV BLOCKING MATERIAL AND MOBILE DEVICE INCLUDING THE APPARATUS

(71) Applicant: SAMSUNG ELECTRONICS CO., LTD., Suwon-si (KR)

(72) Inventors: Suyeon Lee, Seoul (KR); Unjeong Kim, Suwon-si (KR); Hojung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 290 days.

(21) Appl. No.: 17/844,919

(22) Filed: Jun. 21, 2022

(65) Prior Publication Data

US 2023/0204419 A1 Jun. 29, 2023

(30) Foreign Application Priority Data

Dec. 23, 2021 (KR) .................. 10-2021-0186594

(51) Int. Cl.
*G01J 3/32* (2006.01)
*G01J 3/02* (2006.01)
(Continued)

(52) U.S. Cl.
CPC .............. *G01J 3/32* (2013.01); *G01J 3/0213* (2013.01); *G01J 3/10* (2013.01); *G01J 3/2803* (2013.01);
(Continued)

(58) Field of Classification Search
CPC .... G01J 3/32; G01J 3/0213; G01J 3/10; G01J 3/2803; G01J 3/2823; G01J 2003/2813;
(Continued)

(56) References Cited

U.S. PATENT DOCUMENTS 6,130,435 A 10/2000 Rocklin
6,958,729 B1 10/2005 Metz
(Continued)

FOREIGN PATENT DOCUMENTS

JP 2007-218783 A 8/2007
JP 2017-003499 A 1/2017
(Continued)

OTHER PUBLICATIONS

Communication dated Sep. 23, 2023 issued by the Korean Intellectual Property Office in Korean Application No. 10-2021-0186594.
(Continued)

*Primary Examiner* — Michelle M Iacoletti
*Assistant Examiner* — Noah J. Haney
(74) *Attorney, Agent, or Firm* — Sughrue Mion, PLLC

(57) ABSTRACT

An apparatus for detecting an ultraviolet blocking material includes a light receiver configured to acquire detection light from a target object; a spectrum signal generator configured to generate spectrum signals based on the detection light; and a processor configured to: select a reference wavelength from a range from about 290 nm to about 400 nm, and detect an ultraviolet blocking material based on a first spectrum signal of a first wavelength less than the reference wavelength and a second spectrum signal of a second wavelength greater than the reference wavelength, the first spectrum signal and the second spectrum signal being generated by the spectrum signal generator.

20 Claims, 12 Drawing Sheets

(51) Int. Cl.
*G01J 3/10* (2006.01)
*G01J 3/28* (2006.01)
*G01N 21/01* (2006.01)
*G01N 21/17* (2006.01)
*G01N 21/25* (2006.01)
*G01N 21/31* (2006.01)
*G01N 21/33* (2006.01)

(52) U.S. Cl.
CPC .......... *G01J 3/2823* (2013.01); *G01N 21/255* (2013.01); *G01N 21/314* (2013.01); *G01N 21/33* (2013.01); *G01J 2003/2813* (2013.01); *G01J 2003/2826* (2013.01); *G01N 2021/0168* (2013.01); *G01N 2021/1765* (2013.01); *G01N 2021/317* (2013.01); *G01N 2201/0221* (2013.01)

(58) Field of Classification Search
CPC .......... G01J 2003/2826; G01N 21/255; G01N 21/314; G01N 21/33; G01N 2021/0168; G01N 2021/1765; G01N 2021/317; G01N 2201/0221
USPC ....................................................... 356/237.2
See application file for complete search history.

(56) References Cited

U.S. PATENT DOCUMENTS

| | | | |
|---|---|---|---|
| 8,045,157 | B2 | 10/2011 | Shibayama et al. |
| 9,322,769 | B2 | 4/2016 | Alfano et al. |
| 9,551,616 | B2 | 1/2017 | McQuilkin et al. |
| 9,851,298 | B1* | 12/2017 | Isikman .................. G01N 21/33 |
| 10,168,207 | B2* | 1/2019 | Brown ...................... G08B 5/38 |
| 10,170,509 | B2 | 1/2019 | Ockenfuss |
| 10,620,447 | B2 | 4/2020 | Filhaber |
| 2006/0244961 | A1* | 11/2006 | Cole ....................... A61B 5/441  356/319 |
| 2014/0061486 | A1 | 3/2014 | Bao et al. |
| 2015/0044098 | A1 | 2/2015 | Smart et al. |
| 2017/0249436 | A1* | 8/2017 | Miller .................... G16H 70/40 |
| 2017/0303790 | A1 | 10/2017 | Bala et al. |
| 2018/0045953 | A1 | 2/2018 | Fan et al. |
| 2019/0038211 | A1* | 2/2019 | Rattner ..................... G01J 1/429 |
| 2019/0049296 | A1 | 2/2019 | Cho et al. |
| 2019/0059805 | A1* | 2/2019 | Cohen .................... G01J 1/0219 |
| 2019/0086259 | A1 | 3/2019 | Cho |
| 2019/0277693 | A1 | 9/2019 | Kim et al. |
| 2019/0346306 | A1* | 11/2019 | Jeong .................... G01J 1/0429 |
| 2020/0314983 | A1 | 10/2020 | Park et al. |
| 2021/0127101 | A1 | 4/2021 | Roh et al. |
| 2022/0003906 | A1 | 1/2022 | Kim et al. |
| 2022/0091087 | A1 | 3/2022 | Kim et al. |
| 2022/0191432 | A1 | 6/2022 | Lee et al. |
| 2023/0314323 | A1* | 10/2023 | Lee .................... G01N 21/6445  250/458.1 |
| 2023/0417670 | A1* | 12/2023 | Nicolas .............. G01N 21/6408 |

FOREIGN PATENT DOCUMENTS

| | | |
|---|---|---|
| KR | 10-2018-0112100 A | 10/2018 |
| KR | 10-2146561 B1 | 8/2020 |
| WO | 2004/039414 A1 | 5/2004 |

OTHER PUBLICATIONS

Pratt, Harry, et al., "UV imaging reveals facial areas that are prone to skin cancer are disproportionately missed during sunscreen application", PLOS One, Oct. 2, 2017, 14 pages. https://doi.org/10.1371/journal.pone.0185297.

* cited by examiner

APPARATUS FOR DETECTING UV BLOCKING MATERIAL AND MOBILE DEVICE INCLUDING THE APPARATUS

CROSS-REFERENCE TO RELATED APPLICATION

This application is based on and claims priority under 35 U.S.C. § 119 to Korean Patent Application No. 10-2021-0186594, filed on Dec. 23, 2021, in the Korean Intellectual Property Office, the disclosure of which is incorporated by reference herein in its entirety.

BACKGROUND

1. Field

Example embodiments of the present disclosure relates to an apparatus for detecting an ultraviolet ray (UV) blocking material and a mobile device including the apparatus.

2. Description of Related Art

Ultraviolet (UV) rays refer to light in the band of about 290 nm to about 400 nm and include ultraviolet B (UVB) rays, which are in the band of about 290 nm to about 320 nm and ultraviolet A (UVA) rays, in the band of about 320 nm to about 400 nm.

UV blocking materials are used to prevent burns and deoxyribonucleic acid (DNA) modification due to penetration of UV rays into the skin. Chemicals used for UV blocking materials reflect or scatter UV rays or absorb UV rays to prevent the UV rays from penetrating into the skin. For example, UV blocking materials include inorganic chemicals such as zinc oxide (ZnO) and titanium dioxide ($TiO_2$) and organic chemicals such as benzone.

A method of analyzing a reflection spectrum of a UV blocking material is used to determine whether the UV blocking material is uniformly applied to the skin. A method of irradiating the skin with UV rays emitted from a UV light source as a method of analyzing the reflection spectrum of the UV blocking material is inappropriate because the UV light source has to directly irradiate a human body with UV light, and thus causing harm to the skin. In addition, a method of adding a color-reacting material to UV rays as a method of analyzing the reflection spectrum of the UV blocking material is impractical.

SUMMARY

Example embodiments of the present disclosure provide an apparatus for detecting a UV blocking material and a mobile device including the apparatus. The technical problems of the embodiment are not limited to the technical problems described above, and other technical problems may be inferred from the following embodiments.

Additional aspects will be set forth in part in the description which follows and, in part, will be apparent from the description, or may be learned by practice of the presented embodiments of the disclosure.

According to an aspect of the disclosure, there is provided an apparatus for detecting an ultraviolet blocking material, the apparatus including: a light receiver configured to acquire detection light from a target object; a spectrum signal generator configured to generate spectrum signals based on the detection light; and a processor configured to: select a reference wavelength from a range from about 290 nm to about 400 nm, and detect an ultraviolet blocking material based on a first spectrum signal of a first wavelength less than the reference wavelength and a second spectrum signal of a second wavelength greater than the reference wavelength, the first spectrum signal and the second spectrum signal being generated by the spectrum signal generator.

The spectrum signal generator may further include a spectral filter configured to filter the detection light for each wavelength among a plurality of wavelengths.

The spectral filter may be further configured to transmit therethrough light with a wavelength selected from a range from about 100 nm to about 840 nm.

The first wavelength and the second wavelength may be determined based on the reference wavelength, a central wavelength, and a full width at half maximum, and the spectral filter may be further configured to transmit therethrough light with the first wavelength and the second wavelength.

The processor may be further configured to select 400 nm as the reference wavelength.

The processor may be further configured to detect the ultraviolet blocking material based on a change ratio of the second spectrum signal to the first spectrum signal.

The processor may be further configured to determine that the ultraviolet blocking material is in the target object based on the change ratio of the second spectrum signal to the first spectrum signal being greater than a reference change ratio.

The processor may be further configured to generate an RGB image by using the second spectrum signal.

The apparatus may further include a light source configured to emit the detection light toward the target object.

The apparatus may further include: a display, wherein the processor may be further configured to generate a hyperspectral image for detecting the ultraviolet blocking material based on the first spectrum signal and the second spectrum signal and control the display to display the hyperspectral image.

According to an aspect of the disclosure, there is provided a mobile device including: a main body case; a hyperspectral image sensor accommodated in the main body case; and a processor configured to control the hyperspectral image sensor, wherein the hyperspectral image sensor includes a light receiver configured to acquire detection light from a target object, and a spectrum signal generator configured to generate spectrum signals based on the detection light, and the processor is further configured to: select a reference wavelength from a range from about 290 nm to about 400 nm, and detect an ultraviolet blocking material based on a first spectrum signal of a first wavelength less than the reference wavelength and a second spectrum signal of a second wavelength greater than the reference wavelength, the first spectrum signal and the second spectrum signal being generated by the spectrum signal generator.

The spectrum signal generator may further include a spectral filter configured to filter the detection light for each wavelength, among a plurality of wavelengths.

The spectral filter may be further configured to transmit therethrough light with a wavelength selected from a range from about 100 nm to about 840 nm.

The first wavelength and the second wavelength may be determined based on the reference wavelength, a central wavelength, and a full width at half maximum, and the spectral filter may be further configured to transmit therethrough light with the first wavelength and the second wavelength.

The processor may be further configured to select 400 nm as the reference wavelength.

The processor may be further configured to detect the ultraviolet blocking material based on a change ratio of the second spectrum signal to the first spectrum signal.

The processor may be further configured to determine that the ultraviolet blocking material is in the target object based on the change ratio of the second spectrum signal to the first spectrum signal being greater than a preset reference change ratio.

The processor may be further configured to generate an RGB image by using the second spectrum signal.

The mobile device may further include a light source configured to emit the detection light toward the target object.

The mobile device may further include a display, wherein the processor may be further configured to generate a hyperspectral image for detecting the ultraviolet blocking material based on the first spectrum signal and the second spectrum signal and control the display to output the hyperspectral image.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
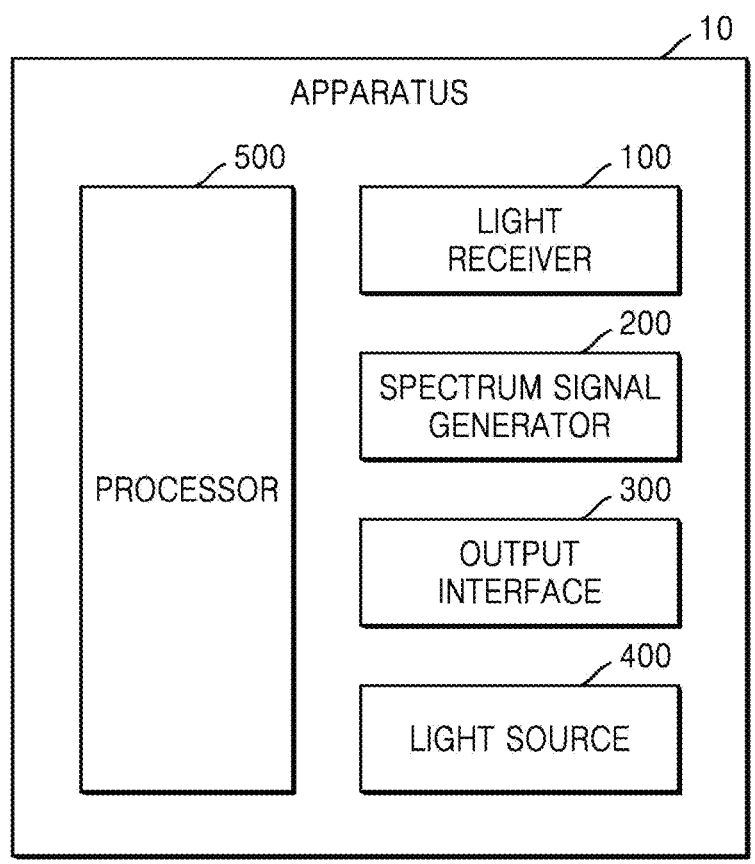
FIG. 1 is a block diagram of an apparatus for detecting an ultraviolet (UV) blocking material, according to an example embodiment.

Reference will now be made in detail to embodiments, examples of which are illustrated in the accompanying drawings, wherein like reference numerals refer to like elements throughout. In this regard, the example embodiments of the disclosure may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Phrases such as "some embodiments" or "one embodiment" in the specification indicate the same embodiment.

Some embodiments of the disclosure may be represented by functional block configurations and various processing operations. Some or all of the functional block configurations may be implemented by various pieces of hardware and/or software for performing certain functions. For example, functional blocks of the disclosure may be implemented by one or more microprocessors or may be implemented by circuit configurations for a certain function. In addition, for example, the functional blocks of the disclosure may be implemented in various programming or scripting languages. The functional blocks may be implemented by using an algorithm executed by one or more processors. In addition, the disclosure may adopt the related art for an electronic configuration, signal processing, data processing and/or so on. The terms "mechanism", "element", "means", "configuration", and so on may be widely used and are not limited to mechanical and physical configurations.

In addition, connection lines or connection members between components illustrated in the drawing are examples in which functional connections and/or physical or circuit connections are illustrated. In an actual apparatus, connections between components may be represented by a variety of functional connections, physical connections, or circuit connections that may be replaced or added.

FIG. 1 is a block diagram of an apparatus for detecting an ultraviolet (UV) blocking material, according to an example embodiment.

Referring to FIG. 1, an apparatus 10 for detecting a UV blocking material may include a light receiver 100, a spectrum signal generator 200, an output interface 300, and a processor 500. According to an example embodiment, the apparatus 10 may further include a light source 400.

The light receiver 100 may acquire detection light from a target object. According to an example embodiment, the detection light may indicate light received by the light receiver 100 when light emitted by an external light source and/or the light source 400 is reflected by the target object and the reflected light is received by the light receiver 100. In another example embodiment, the detection light may indicate light received by the light receiver 100 when light emitted by an external light source and/or the light source 400 is scattered by a target object and the scattered light is received by the light receiver 100. In another example embodiment, the detection light may also indicate fluorescence emitted from a target object due to absorption of light when light emitted by an external light source and/or the light source 400 is absorbed by the target object. In another example embodiment, the detection light may also indicate Raman spectroscopy. However, the detection light of the disclosure is not limited thereto and may indicate all of the light detected by the light receiver 100 as a result of light irradiation.

The spectrum signal generator 200 may generate spectrum signals for detection light. The spectrum signal generator 200 may split the detection light for each wavelength and generate a spectrum signal for each of the split detection lights.

The processor 500 may receive a spectrum signal from the spectrum signal generator 200. The processor 500 may generate a hyperspectral image of a target object based on the spectrum signal. The hyperspectral image may indicate a combination of spectrum distribution of a target object.

The output interface 300 may include a display that outputs a hyperspectral image. The processor 500 may control the output interface 300 to output a hyperspectral image.

The light source 400 may irradiate a target object with light. The light source 400 may include a light source array including a plurality of light sources. The light source 400 may emit light to a partial region or all regions of a target object. When the light source 400 emits light to a partial region of a target object, the light source 400 may emit light while changing an inspection region of the target object.

The light source 400 may emit light with wavelengths of infrared rays, visible rays, and ultraviolet rays. To this end, the light source 400 may include a light emitting diode (LED).

Figure 2:
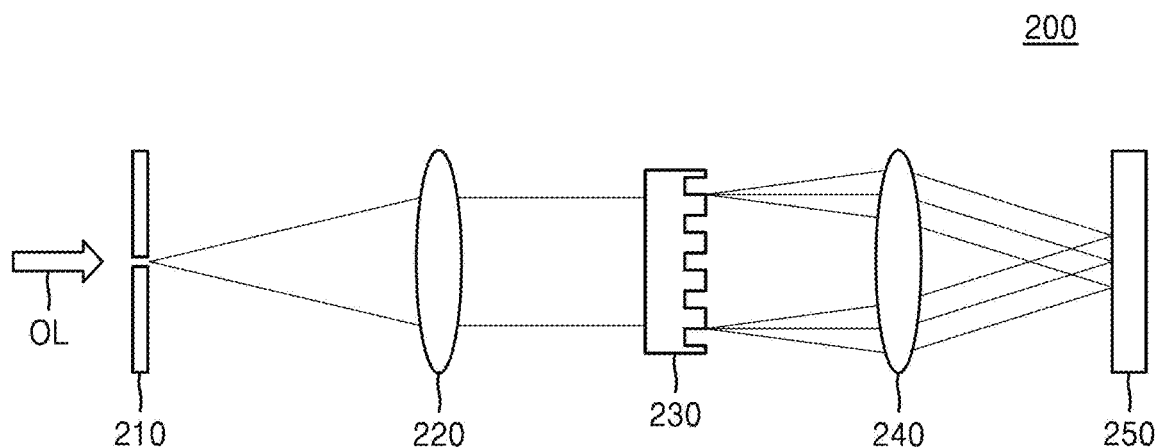
FIG. 2 is a conceptual view of a spectrum signal generator according to an example embodiment.
Figure 3:
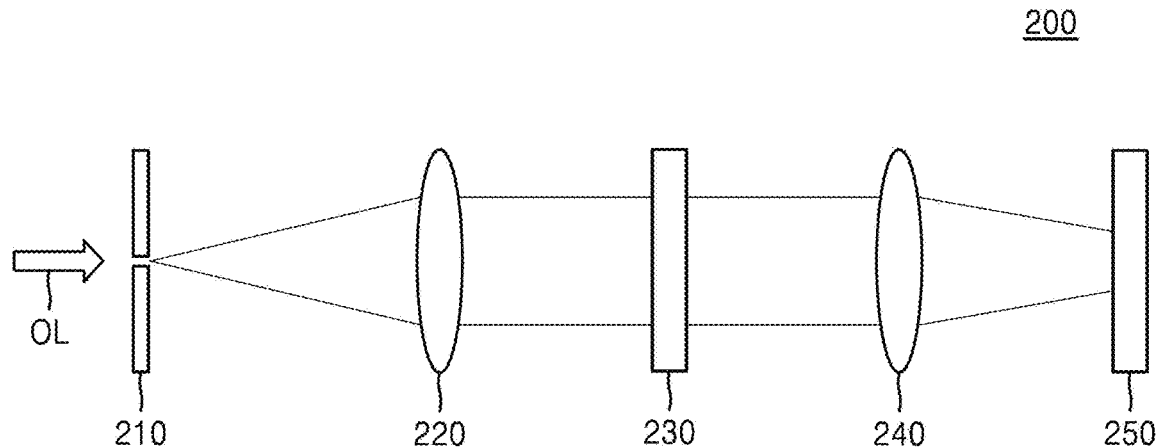
FIG. 3 is a conceptual view of a spectrum signal generator according to another example embodiment.

FIG. 2 is a conceptual view of a spectrum signal generator according to an example embodiment, and FIG. 3 is a conceptual view of a spectrum signal generator according to another example embodiment.

Referring to FIGS. 2 to 3, the spectrum signal generator 200 may include a lens 220, a spectral filter 230, and a spectrum signal converter 250. According to an example embodiment, the spectrum signal generator 200 may further include a slit element 210 and a condensing lens 240.

The slit element 210 may be used to extract parts required for inspection from detection light. The detection light may be radiated by the slit element 210.

The lens 220 may receive detection light passing through the slit element 210. The lens 220 may adjust the detection light to become parallel light or convergent light. For example, the lens 220 may include a collimating lens. The collimating lens may include a convex lens.

The spectral filter 230 may split detection light provided from the lens 220. The spectral filter 230 may be mechanically formed as illustrated in FIG. 2 or electrically formed as illustrated in FIG. 3. For example, the spectral filter 230 may include a prism as illustrated in FIG. 2.

The spectral filter 230 may transmit therethrough light of different wavelength bands. For example, the spectral filter 230 may transmit therethrough light with a wavelength selected from a range from about 100 nm to about 840 nm. The spectral filter 230 transmits therethrough light with a wavelength of about 100 nm to about 840 nm to generate a hyperspectral image for detecting a UV blocking material by using a wavelength of about 100 nm to about 400 nm, and at the same time, to generate a visible image by using a wavelength of about 400 nm to about 840 nm.

The spectral filter 230 may filter detection light provided from the lens 220 to have spatially different wavelengths. In other words, detection lights passing through different regions of the spectral filter 230 may have different wavelengths.

Detection lights split by the spectral filter 230 may pass through the condensing lens 240 and be provided to the spectrum signal converter 250. For example, the condensing lens 240 may include a convex lens.

The spectrum signal converter 250 may generate a spectrum signal for the detection light. The spectrum signal converter 250 may provide the spectrum signal to the processor 500.

The processor 500 may generate a hyperspectral image of a target object based on the spectrum signal. The hyperspectral image of the target object may be generated by merging spectral distribution information for each position of the target object. In other words, the hyperspectral image of the target object may be a set of spectral distributions for each position of the target object. For example, the processor 500 may generate a hyperspectral image for an object by removing offsets from a plurality of sub-hyperspectral images and summing the sub-hyperspectral images from which the offsets are removed. However, a method of generating a hyperspectral image of the disclosure is not limited thereto, and a method of generating a known hyperspectral image may be used therefor.

Figure 4:
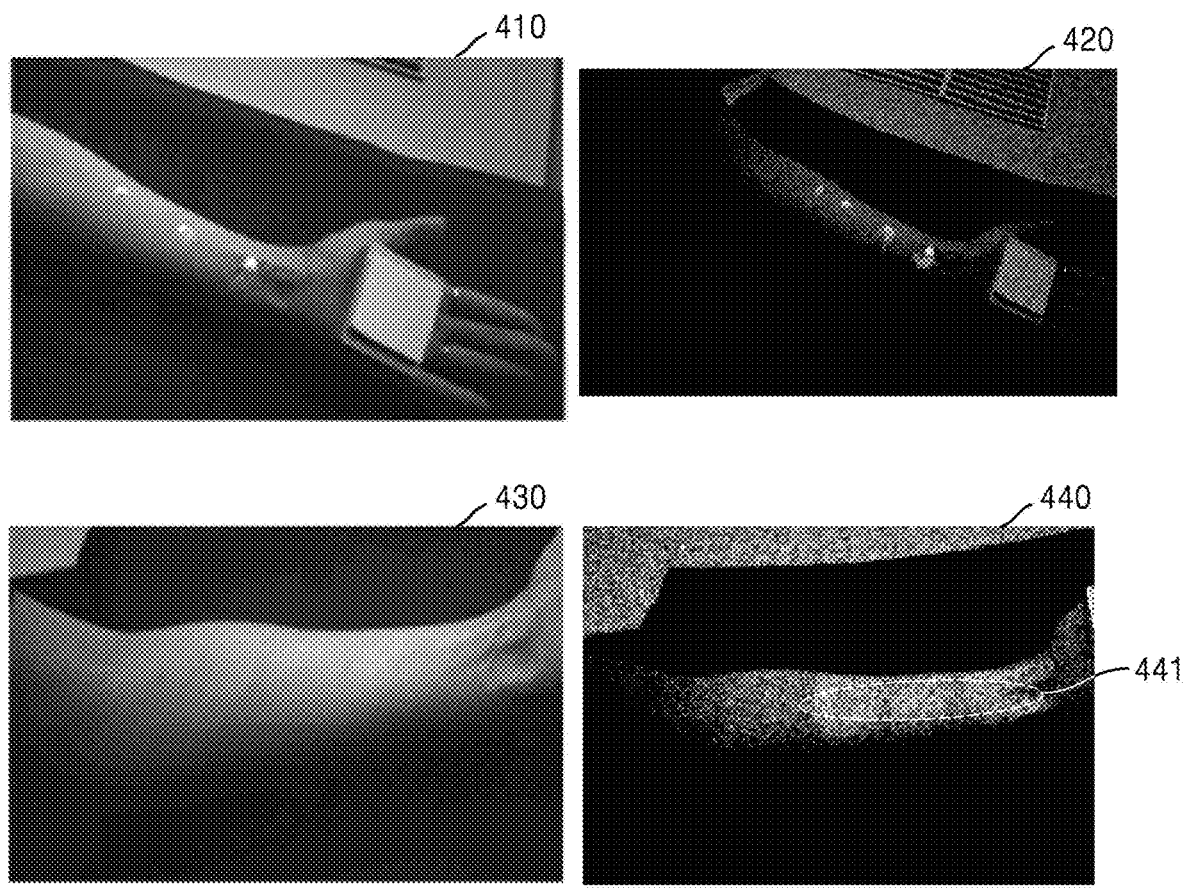
FIG. 4 illustrates RGB images and hyperspectral images of skin coated with a UV blocking material.

FIG. 4 is a view illustrating an RGB image and a hyperspectral image of skin coated with a UV blocking material.

FIG. 4 illustrates RGB images 410 and 430 and hyperspectral images 420 and 440 of skin coated with a UV blocking material.

As illustrated in FIG. 4, when a concentration per unit area of a UV blocking material is greater than a reference concentration, presence or absence of the UV blocking material may be easily detected even by the RGB image 410, but when the concentration per unit area of the UV blocking material is less than the reference concentration, presence or absence of the UV blocking material may not be easily detected by the RGB image 430. In contrast to this, a coating area 441 of the UV blocking material may be easily detected by using the hyperspectral image 440 regardless of the concentration per unit area of the UV blocking material. Accordingly, the apparatus 10 of the disclosure may detect a UV blocking material by using hyperspectral spectrum information.

Figure 5A:
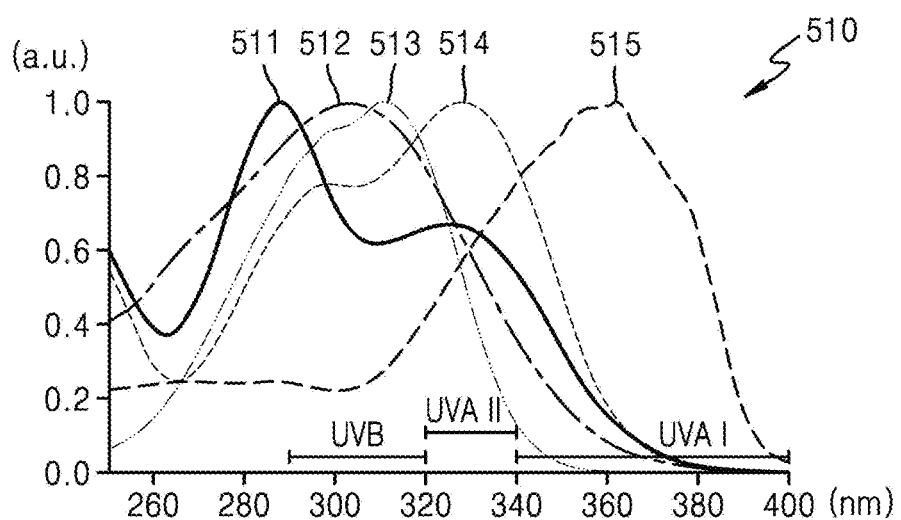
FIGS. 5A and 5B illustrate absorption spectra of organic and inorganic chemicals.
Figure 5B:
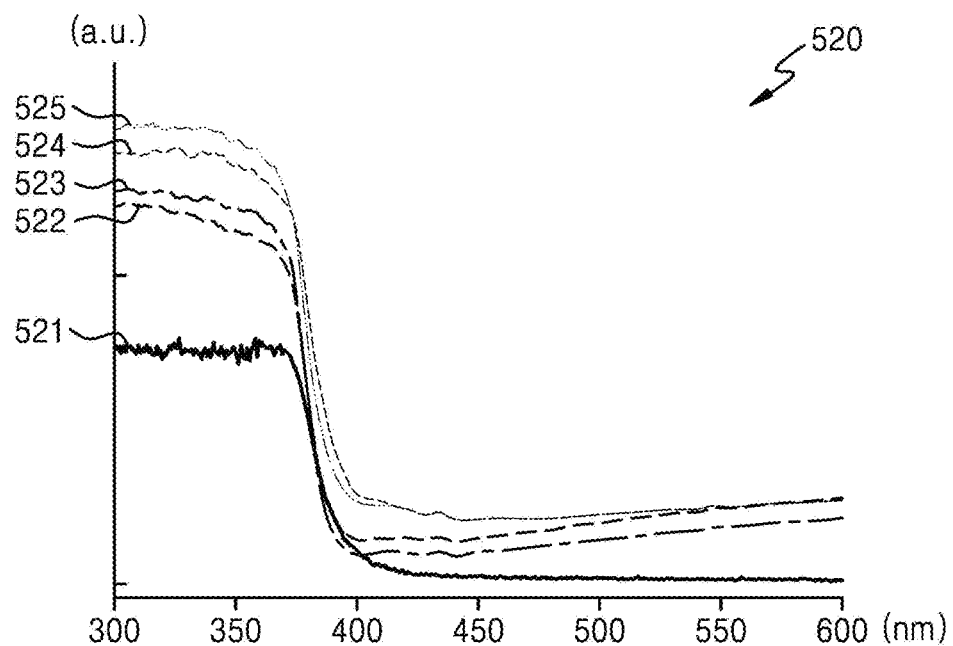

FIGS. 5A and 5B illustrate absorption spectra of organic and inorganic chemicals.

Referring to FIG. 5A, a UV blocking material may include at least one of organic and inorganic chemical. The organic and inorganic chemicals absorb ultraviolet rays included in an external light source and/or the light source 400 to prevent the ultraviolet rays from penetrating into the skin. FIG. 5A illustrates an absorption spectrum graph 510 of organic chemicals used in a UV blocking material and FIG. 5B illustrates an absorption spectrum graph 520 of inorganic chemicals used therein. In FIGS. 5A and 5B, an x axis represents a wavelength, and a y axis represents absorbance.

The absorption spectrum graph 510 illustrated in FIG. 5A includes an absorption spectrum 511 of oxybenzone, an absorption spectrum 512 of octocrylene, an absorption spectrum 513 of octinoxate, an absorption spectrum 514 of caffeic acid, and an absorption spectrum 515 of avobenzone. In addition, the absorption spectrum graph 520 illustrated in FIG. 5A includes an absorption spectrum 521 of titanium dioxide (TiO2), an absorption spectrum 525 of zinc oxide (ZnO), an absorption spectrum 522 of a compound with a ratio of 1:9 between zinc oxide (ZnO) and titanium dioxide ($ZnO-TiO_2$), an absorption spectrum 523 of a compound with a ratio of 1:6 between zinc oxide (ZnO) and titanium dioxide ($ZnO-TiO_2$), and an absorption spectrum 524 of a compound with a ratio of 1:3 between zinc oxide (ZnO) and titanium dioxide ($ZnO-TiO_2$).

As illustrated in FIGS. 5A and 5B, organic and inorganic chemicals used as a UV blocking materials absorb light with a wavelength of 400 nm or less. In addition, an absorption spectrum of a UV blocking material changes rapidly in the vicinity of a wavelength of 400 nm. Accordingly, the apparatus 10 of the disclosure may detect a UV blocking material based on a wavelength of 400 nm.

Figure 6:
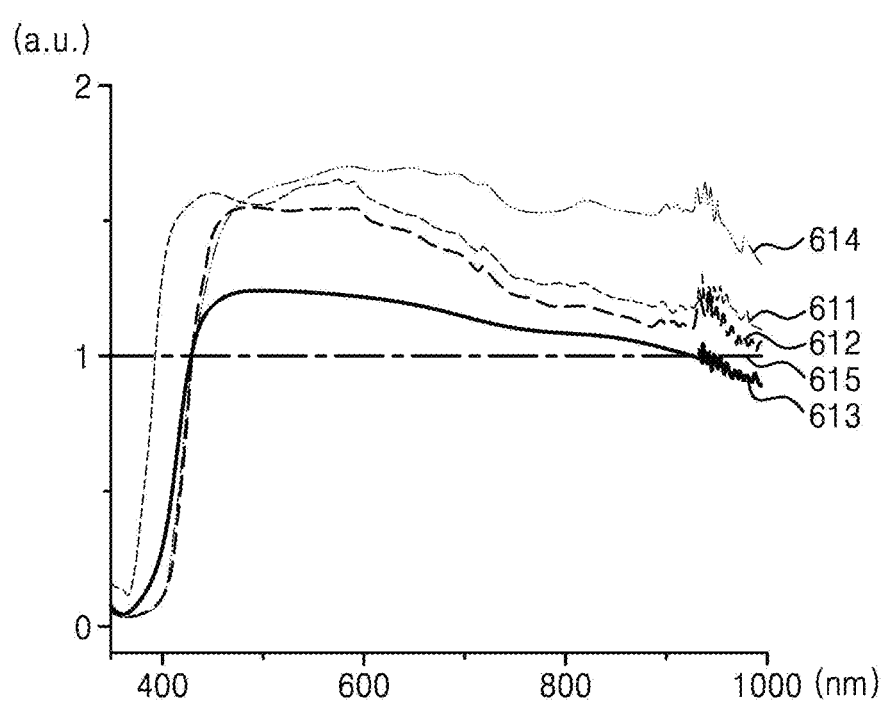
FIG. 6 illustrates reflection spectra of UV blocking products.

FIG. 6 illustrates reflection spectra of UV blocking products.

Referring to FIG. 6, a UV blocking product may include at least one of organic and inorganic chemicals. For example, the UV blocking product may include a sunscreen in a solid or liquid form.

Some wavelengths of light emitted from an external light source and/or the light source 400 may be absorbed, scattered, and reflected by organic and inorganic chemicals, and thus, a reflection spectrum is generated.

In addition, intensity of a reflection spectrum signal may be affected by intensity of an external light source (for example, natural light). The apparatus 10 of the disclosure may normalize each of reflection spectrum signals by using reflection spectrum information of a reference plate to remove an error in a detection result due to intensity of an external light source.

According to an example embodiment, the reference plate may indicate a flat object to which a UV blocking material is not applied. According to an example embodiment, the reference plate may indicate a flat object to which any one of UV blocking products illustrated in FIG. 6 is applied. The reference plate may be placed in the same environment as UV blocking products. The apparatus 10 may simultaneously image the reference plate and a UV blocking material.

Spectrum information of an external light source and/or the light source 400 may be acquired from a reflection spectrum of the reference plate. Because the reference plate is placed in the same environment as the UV blocking products, the apparatus 10 may analyze influence of an external light source and/or the light source 400 through reflection spectrum information of the reference plate. In other words, the apparatus 10 may normalize reflection spectrum signals of UV blocking products by using spectrum information of an external light source and/or the light source 400.

The reflection spectrum signal of each of the UV blocking products may be normalized by a reflection spectrum signal of the reference plate. In one embodiment, a normalized reflection spectrum signal may be acquired by dividing the reflection spectrum signal of each of the UV blocking products by the reflection spectrum signal of the reference plate. However, the normalization method of the disclosure is not limited thereto, and various normalization methods for removing an error in a detection result caused by an external light source may be used.

FIG. 6 illustrates normalized reflection spectra 611 to 615 of UV blocking products. In FIG. 6, an x axis represents a wavelength, and a y axis represents a ratio of a reflection spectrum signal of a UV blocking product to a reflection spectrum signal of a reference plate. In this case, the ratio may indicate a ratio of intensity of a signal.

As illustrated in FIG. 6, a reflection spectrum of a UV blocking product has the smallest value at a wavelength of 400 nm. In addition, the reflection spectrum of a UV blocking product changes rapidly in the vicinity of a wavelength of 400 nm. Accordingly, the apparatus 10 of the disclosure may detect a UV blocking material based on the wavelength of 400 nm.

Figure 7:
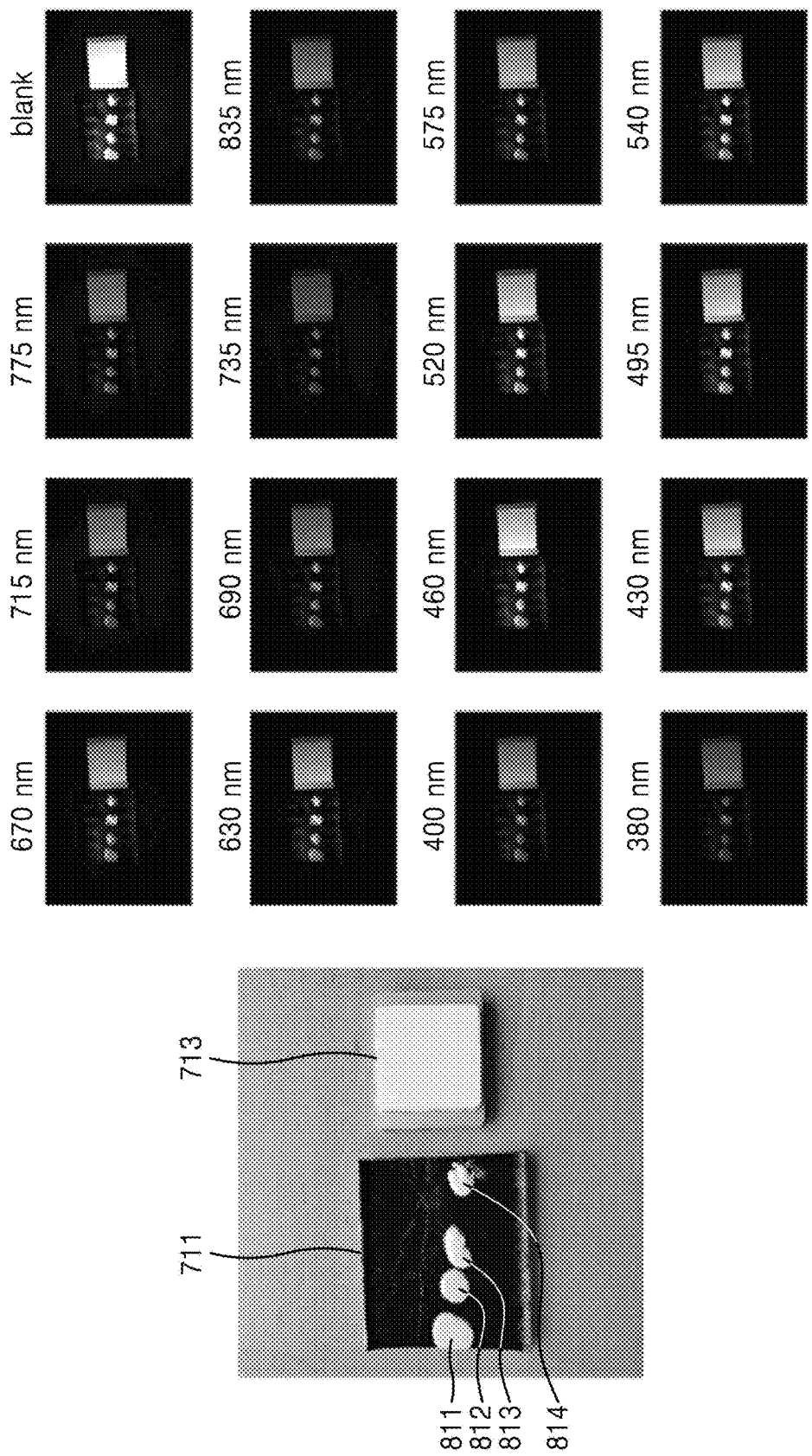
FIG. 7 illustrates hyperspectral images for each wavelength of UV blocking materials.
Figure 8:
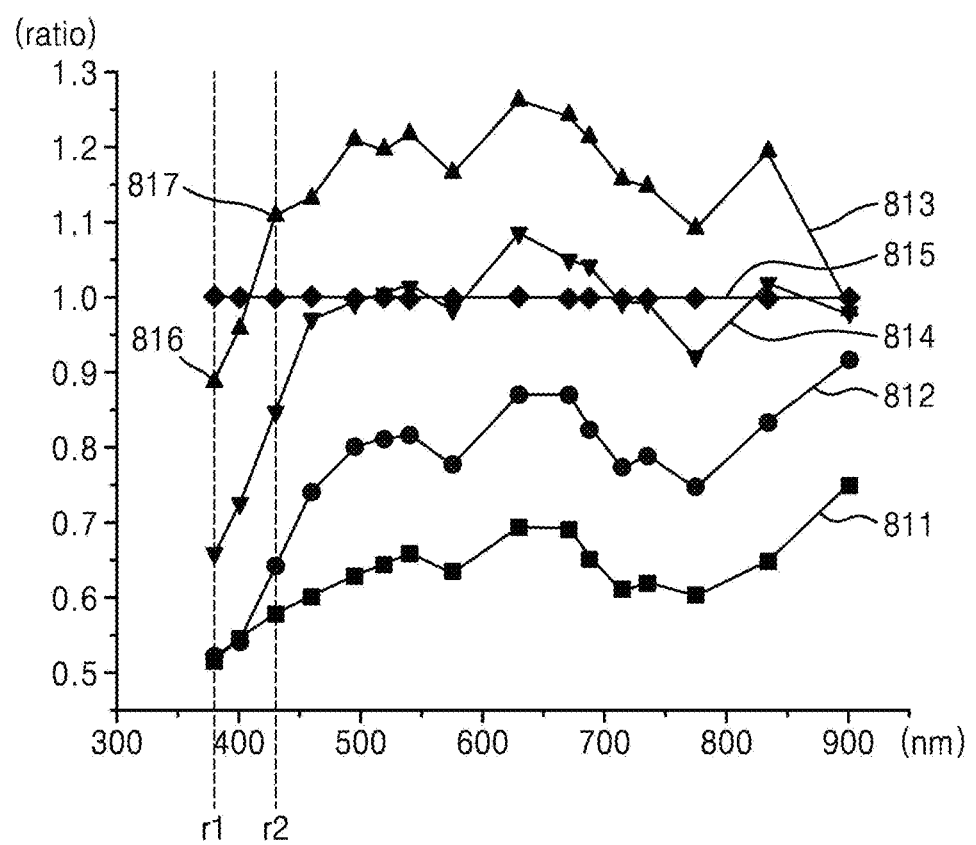
FIG. 8 illustrates spectrum signals for each wavelength of UV blocking materials.

FIG. 7 illustrates hyperspectral images for each wavelength of a UV blocking materials, and FIG. 8 is a diagram illustrating spectrum signals for each wavelength of the UV blocking materials.

Referring to FIGS. 7 and 8, UV blocking materials 811, 812, 813 and 814 814 may be applied to a support 711 of FIG. 7. In addition, a reference plate 713 may be placed adjacent to the support 711. According to an example embodiment, the reference plate 713 may indicate a flat object to which a UV blocking material is not applied. A color of the reference plate 713 may be the same as or similar to colors of the UV blocking materials 811 to 814.

The apparatus 10 may simultaneously image the UV blocking materials 811 to 814 and the reference plate 713. The apparatus 10 may generate hyperspectral images for each wavelength of the UV blocking materials 811 to 814 and the reference plate 713. For example, the apparatus 10 may acquire detection light from the UV blocking materials 811 to 814 and the reference plate 713 and generate hyperspectral images with wavelengths of 380 nm, 400 nm, 430 nm, 460 nm, 495 nm, 520 nm, 540 nm, 575 nm, 630 nm, 670 nm, 690 nm, 715 nm, 735 nm, 775 nm, and 835 nm from the detection light.

FIG. 8 illustrates spectra for each wavelength of the UV blocking materials 811 to 814. In addition, the spectrum signals for each wavelength of the UV blocking materials 811 to 814 are normalized according to reflection spectrum information 815 of the reference plate 713 and illustrated in FIG. 8. In FIG. 8, an x axis represents a wavelength, and a y axis represents ratios of the reflection spectrum signal of the UV blocking materials 811 to 814 to the reflection spectrum signal of the reference plate 713.

As illustrated in FIG. 8, reflection spectra of the UV blocking materials 811 to 814 change rapidly in the vicinity of a wavelength of 400 nm. In other words, the reflection spectrums of the UV blocking materials 811 to 814 have the largest slopes in the vicinity of the wavelength of 400 nm. Accordingly, the apparatus 10 of the disclosure may detect a UV blocking material based on a change ratio of a reflection spectrum in the vicinity of a wavelength of 400 nm.

The apparatus 10 may detect a UV blocking material based on a first spectrum signal 816 with a first wavelength r1 that is less than a reference wavelength and a second spectrum signal 817 with a second wavelength r2 that is greater than the reference wavelength. According to an example embodiment, the reference wavelength may be set to 400 nm. The reason that the reference wavelength is not set to a wavelength greater than 400 nm is because the wavelength greater than 400 nm is a visible light wavelength and it is not easy to distinguish between a UV blocking material and other materials.

The apparatus 10 may detect a UV blocking material based on a change ratio of the second spectrum signal 817 to the first spectrum signal 816. The change ratio of the second spectrum signal 817 to the first spectrum signal 816 may indicate a change ratio of a spectrum signal per unit wavelength. In this case, the unit wavelength may indicate a difference between the second wavelength r2 and the first wavelength r1. In other words, the apparatus 10 may detect a UV blocking material based on a slope between the first spectrum signal 816 and the second spectrum signal 817.

When the change ratio of the second spectrum signal to the first spectrum signal is greater than a reference change ratio, the apparatus 10 may determine that there is a UV blocking material in an object. According to an example embodiment, the reference change ratio may be preset. For example, when a reflection spectrum is normalized, the reference change ratio may be set to 0.002 (1/nm) but is not limited thereto. According to an example embodiment, the apparatus 10 may also determine a concentration of a UV blocking material according to intensity of a spectrum signal.

Figure 9:
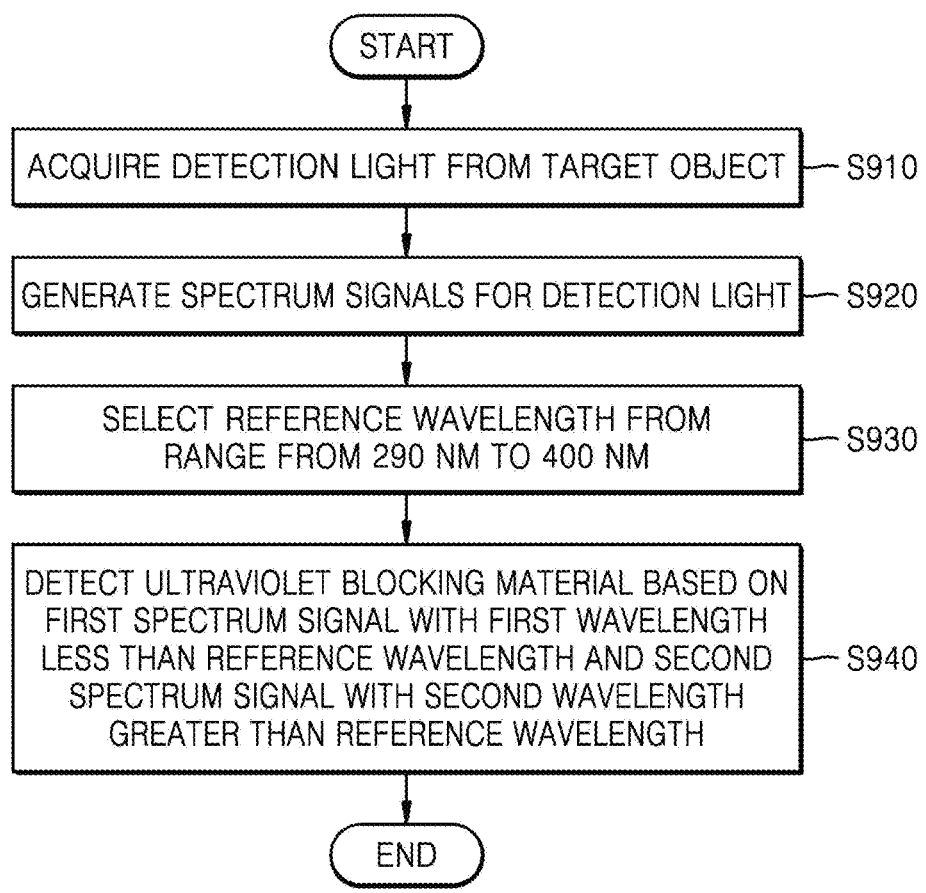
FIG. 9 is a flowchart illustrating a method of detecting a UV blocking material, according to an example embodiment.

FIG. 9 is a flowchart illustrating a method of detecting a UV blocking material, according to an example embodiment.

Referring to FIG. 9, in operation S910, the light receiver 100 may acquire detection light from a target object.

According to an example embodiment, the detection light may indicate light received by the light receiver 100 when light emitted from an external light source and/or the light source 400 is reflected by the target object and the reflected light is received by the light receiver 100. In another embodiment, the detection light may indicate light received by the light receiver 100 when light emitted from an external light source and/or the light source 400 is scattered by a target object and the scattered light is received by the light receiver 100. In another embodiment, the detection light may refer to fluorescence emitted from the object due to absorption of the external light source and/or light emitted by the light source 400 by the object. In another embodiment, the detection light may also indicate the Raman spectroscopy. However, the detection light of the disclosure is not limited thereto and may indicate all of the light detected by the light receiver 100 as a result of light irradiation.

In operation S920, the spectrum signal generator 200 may generate spectrum signals for the detection light.

The spectrum signal generator 200 may divide the detection light for each wavelength and generate a spectrum signal for each of the split detection lights. To this end, the spectrum signal generator 200 may include the spectral filter 230. The spectral filter 230 may transmit therethrough light of different wavelength bands. For example, the spectral filter 230 may transmit therethrough light with a wavelength selected from a range from about 100 nm to about 840 nm. The spectral filter 230 transmits therethrough light with a wavelength of about 100 nm to about 840 nm to generate a hyperspectral image for detecting a UV blocking material by using a wavelength of about 100 nm to about 400 nm, and at the same time, to generate a visible image by using a wavelength of about 400 nm to about 840 nm.

In operation S930, the processor 500 may select a reference wavelength from a range from about 290 nm to about 400 nm.

Because a reflection spectrum of a UV blocking material changes rapidly at a boundary of a UV wavelength, the processor 500 may select the reference wavelength from the range from about 290 nm to about 400 nm. According to an example embodiment, the reference wavelength may be set to 400 nm. The reason that the reference wavelength is not set to a wavelength greater than 400 nm is because the wavelength greater than 400 nm is a visible light wavelength and it is not easy to distinguish between a UV blocking material and other materials.

In operation S940, the processor 500 may detect a UV blocking material based on a first spectrum signal of a first wavelength less than the reference wavelength and a second spectrum signal of a second wavelength greater than the reference wavelength.

A first wavelength and a second wavelength may be determined by the reference wavelength, a central wavelength, and a full width at half maximum (FWHM). A wavelength in which a difference between a first central wavelength and a first FWHM/2 is less than the reference wavelength may be selected as the first wavelength. In addition, a wavelength in which the sum of a second central wavelength and a second FWHM/2 is greater than the reference wavelength may be selected as the second wavelength. According to an example embodiment, the first FWHM may be the same as the second FWHM. A first spectrum signal and a second spectrum signal may be extracted more accurately by setting the first wavelength and the second wavelength in consideration of FWHM/2 instead of the FWHM. In addition, the second spectrum signal may be used to generate a visible image. The processor 500 may generate an RGB image by using the second spectrum signal.

The processor 500 may detect a UV blocking material based on a change ratio of the second spectrum signal to the first spectrum signal. In other words, the processor 500 may detect the UV blocking material based on a slope between the first spectrum signal and the second spectrum signal.

When the change ratio of the second spectrum signal to the first spectrum signal is greater than a preset reference change ratio, the processor 500 may determine that there is a UV blocking material in a target object. According to an example embodiment, the processor 500 may also determine a concentration of the UV blocking material according to intensity of a spectrum signal.

Figure 10:
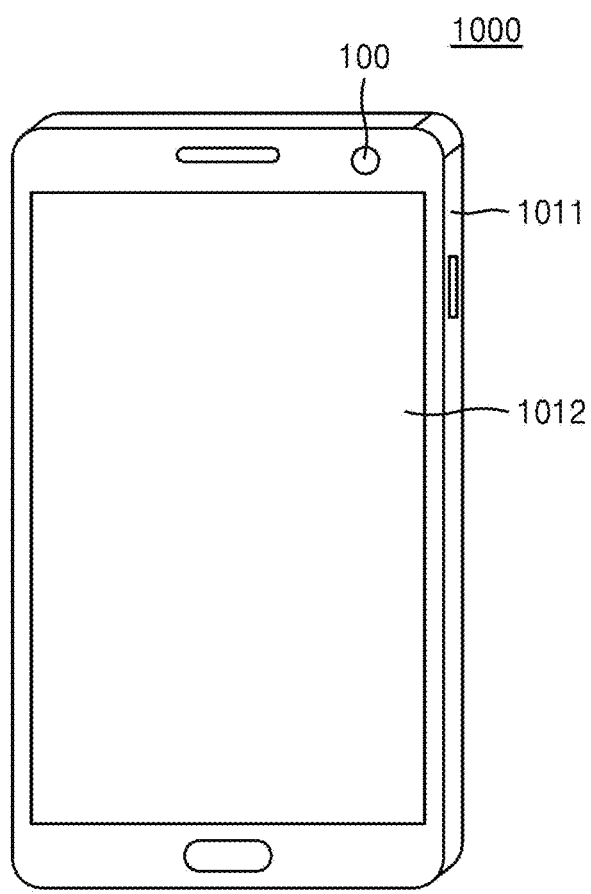
FIGS. 10 to 11 are views illustrating a mobile device capable of detecting a UV blocking material, according to an example embodiment.
Figure 11:
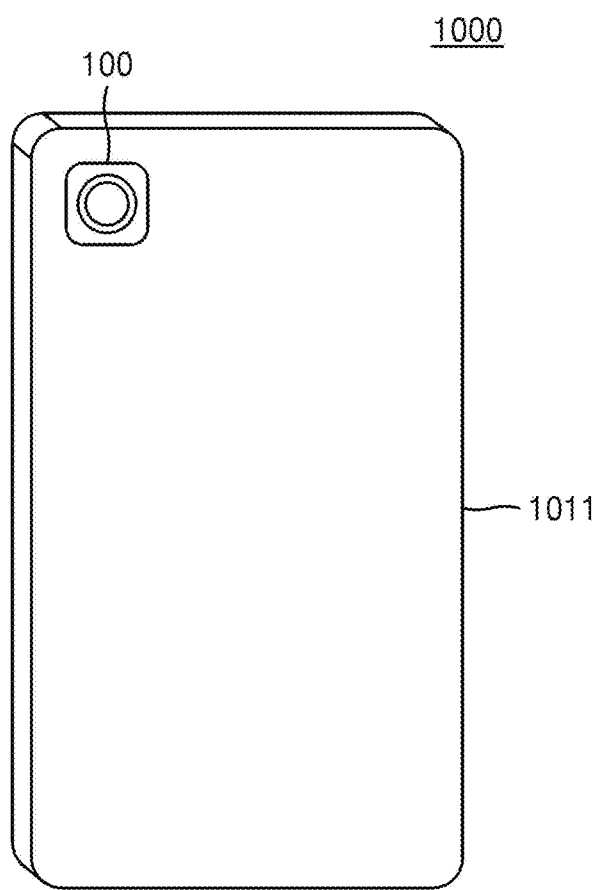

FIGS. 10 to 11 are diagrams illustrating a mobile device that detects a UV blocking material, according to an example embodiment.

Components related to the example embodiment are illustrated in a mobile device 1000 illustrated in FIGS. 10 to 11. Accordingly, it should be understood that other general-purpose components other than the components illustrated in FIGS. 10 to 11 may be further included in the mobile device 1000.

FIGS. 10 to 11, the mobile device 1000 may include a smartphone. The mobile device 1000 may include a main body case 1011 having a front surface and a rear surface, and a display unit 1012 may be provided on the front surface of the mobile device 1000.

The apparatus 10 for detecting a UV blocking material may be implemented in the mobile device 1000, and the light receiver 100 may be implemented on the front surface of the mobile device 1000 as illustrated in FIG. 10 or may be implemented on the rear surface of the mobile device 1000 as illustrated in FIG. 11. When the apparatus 10 is arranged in the rear surface of the mobile device 1000, the apparatus 10 may be implemented by using or modifying an existing camera system.

When the apparatus 10 includes the light source 400, an LED array may be arranged in the front surface or the rear surface of the mobile device 1000.

Figure 12:
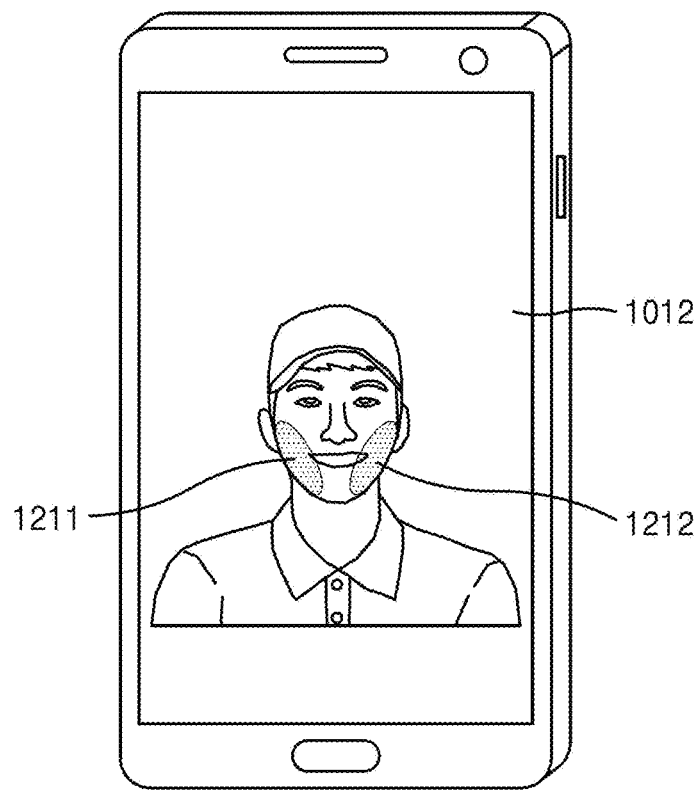
FIG. 12 is a view illustrating an operating method of a mobile device, according to an example embodiment.

FIG. 12 is a view illustrating an operating method of a mobile device, according to an example embodiment.

Referring to FIG. 12, the mobile device 1000 may acquire detection light from a target object. The detection light may be acquired as a result of light emission of an external light source and/or the light source 400. For example, the target object may include a human face.

The mobile device 1000 may set a region of interest (ROI) in the target object. For example, the region of interest may include some regions 1211 and 1212 of a human face.

The mobile device 1000 may generate a spectrum signal for each wavelength of the detection light. To this end, the mobile device 1000 may include the spectral filter 230. The spectral filter 230 may transmit therethrough light of different wavelength bands. For example, the spectral filter 230 may transmit therethrough light with a wavelength selected from a range from about 100 nm to about 840 nm. The spectral filter 230 transmits therethrough light with a wavelength of about 100 nm to about 840 nm to generate a hyperspectral image for detecting a UV blocking material by using a wavelength of about 100 nm to about 400 nm, and at the same time, to generate a visible image by using a wavelength of about 400 nm to about 840 nm.

The mobile device 1000 may select a reference wavelength from a range from about 290 nm to about 400 nm. The reference wavelength may be set to 400 nm.

The mobile device 1000 may detect a UV blocking material based on a first spectrum signal of a first wavelength less than the reference wavelength and a second spectrum signal of a second wavelength greater than the reference wavelength.

A first wavelength and a second wavelength may be determined by the reference wavelength, a central wavelength, and a FWHM. A wavelength in which a difference between a first central wavelength and a first FWHM/2 is less than the reference wavelength may be selected as the first wavelength. In addition, a wavelength in which the sum of a second central wavelength and a second FWHM/2 is greater than the reference wavelength may be selected as the second wavelength. According to an example embodiment, the first FWHM may be the same as the second FWHM. A first spectrum signal and a second spectrum signal may be extracted more accurately by setting the first wavelength and the second wavelength in consideration of FWHM/2 instead of the FWHM. In addition, the second spectrum signal may be used to generate a visible image. The mobile device 1000 may generate an RGB image by using the second spectrum signal.

The mobile device 1000 may detect a UV blocking material based on a change ratio of the second spectrum signal to the first spectrum signal. In other words, the mobile device 1000 may detect the UV blocking material based on a slope between the first spectrum signal and the second spectrum signal.

When the change ratio of the second spectrum signal to the first spectrum signal is greater than a preset reference change ratio, the mobile device 1000 may determine that there is a UV blocking material in a target object. According to an example embodiment, the mobile device 1000 may also determine a concentration of a UV blocking material according to intensity of a spectrum signal.

The mobile device 1000 may output information on presence or absence and a concentration of the UV blocking material through the display unit 1012. A user may uniformly apply the UV blocking material based on the information on the presence or absence and the concentration of the UV blocking material.

Figure 13:
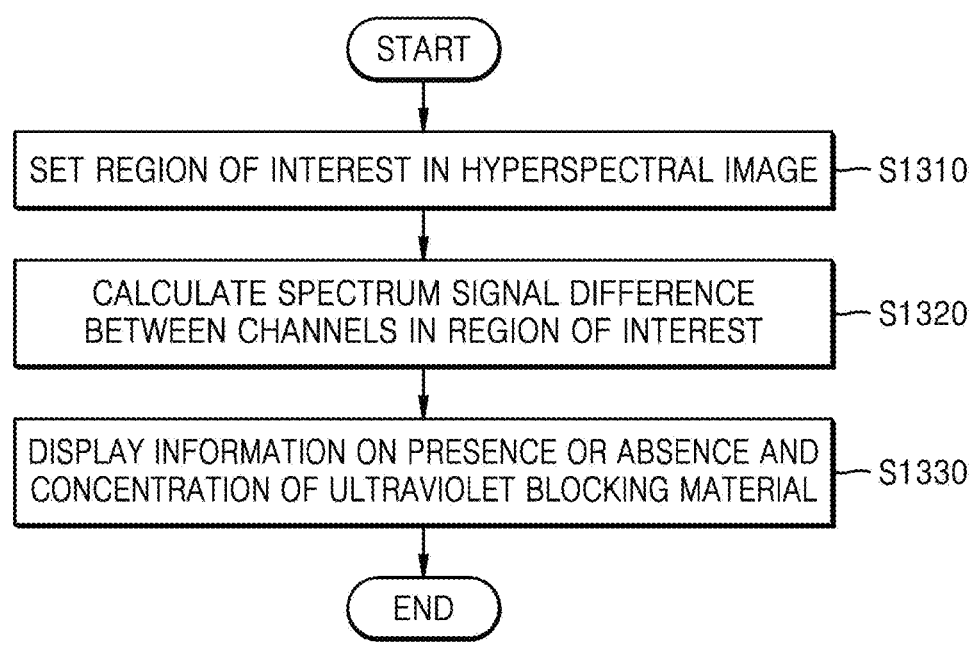
FIG. 13 is a flowchart illustrating an operating method of a mobile device, according to an example embodiment.

FIG. 13 is a flowchart illustrating an operating method of a mobile device, according to an example embodiment.

Referring to FIG. 13, in operation S1310, the mobile device 1000 may set a region of interest in a hyperspectral image. For example, the region of interest may include a partial region of a human face.

In operation S1320, the mobile device 1000 may calculate a spectrum signal difference between channels in the region of interest. In this case, the channels may each indicate a spectrum signal for each wavelength. The mobile device 1000 may determine presence or absence and a concentration of a UV blocking material based on the spectrum signal difference between channels.

In one embodiment, the mobile device 1000 may detect a UV blocking material based on a first spectrum signal of a first wavelength less than a reference wavelength and a second spectrum signal of a second wavelength greater than the reference wavelength.

When a change ratio of the second spectrum signal to the first spectrum signal is greater than a preset reference change ratio, the mobile device 1000 may determine that there is a UV blocking material in an object.

In operation S1330, the mobile device 1000 may output information on the presence or absence and the concentration of the UV blocking material through the display unit 1012.

In one embodiment, the mobile device 1000 may display, on the RGB image, the information on the presence or absence and the concentration of the UV blocking material. In another embodiment, the mobile device 1000 may also display the information on the presence or absence and the concentration of the UV blocking material by outputting a hyperspectral image of a target object.

In addition, the embodiments described above may be implemented by a program that may be executed by a computer and may be implemented by a general-purpose digital computer that executes the program by using a computer-readable recording medium. In addition, the data used in the embodiments described above may be recorded on a computer-readable recording medium through various devices. The computer-readable recording medium may include a storage medium such as a magnetic storage medium (for example, a read only memory (ROM), a floppy disk, a hard disk, or so on) or an optical reading medium (for example, a compact disk (CD)-ROM, a digital video disk (DVD), or so on).

Those skilled in the art related to the embodiments will understand that the embodiments may be implemented in a modified form without departing from the essential characteristics of the above description. Therefore, the disclosed embodiments have to be considered in an illustrative sense rather than a restrictive sense. The scope of rights is represented in the claims rather than the above description, and all differences within the scope equivalent thereto should be construed as included in the embodiment.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An apparatus for detecting an ultraviolet blocking material, the apparatus comprising:
    a light receiver configured to acquire detection light from a target object;
    a spectrum signal generator configured to generate spectrum signals based on the detection light; and
    a processor configured to:
        select a reference wavelength from a range from about 290 nm to about 400 nm, and
        detect an ultraviolet blocking material based on a first spectrum signal of a first wavelength less than the reference wavelength and a second spectrum signal of a second wavelength greater than the reference wavelength, the first spectrum signal and the second spectrum signal being generated by the spectrum signal generator.

2. The apparatus of claim 1, wherein the spectrum signal generator further comprises a spectral filter configured to filter the detection light for each wavelength among a plurality of wavelengths.

3. The apparatus of claim 2, wherein the spectral filter is further configured to transmit therethrough light with a wavelength selected from a range from about 100 nm to about 840 nm.

4. The apparatus of claim 2, wherein the first wavelength and the second wavelength are determined based on the reference wavelength, a central wavelength, and a full width at half maximum, and
the spectral filter is further configured to transmit therethrough light with the first wavelength and the second wavelength.

5. The apparatus of claim 1, wherein the processor is further configured to select 400 nm as the reference wavelength.

6. The apparatus of claim 1, wherein the processor is further configured to detect the ultraviolet blocking material based on a change ratio of the second spectrum signal to the first spectrum signal.

7. The apparatus of claim 6, wherein the processor is further configured to determine that the ultraviolet blocking material is in the target object based on the change ratio of the second spectrum signal to the first spectrum signal being greater than a reference change ratio.

8. The apparatus of claim 1, wherein the processor is further configured to generate an RGB image by using the second spectrum signal.

9. The apparatus of claim 1, further comprising a light source configured to emit the detection light toward the target object.

10. The apparatus of claim 1, further comprising:
a display,
wherein the processor is further configured to generate a hyperspectral image for detecting the ultraviolet blocking material based on the first spectrum signal and the second spectrum signal and control the display to display the hyperspectral image.

11. A mobile device comprising:
a main body case;
a hyperspectral image sensor accommodated in the main body case; and
a processor configured to control the hyperspectral image sensor,
wherein the hyperspectral image sensor comprises a light receiver configured to acquire detection light from a target object, and a spectrum signal generator configured to generate spectrum signals based on the detection light, and the processor is further configured to:
select a reference wavelength from a range from about 290 nm to about 400 nm, and
detect an ultraviolet blocking material based on a first spectrum signal of a first wavelength less than the reference wavelength and a second spectrum signal of a second wavelength greater than the reference wavelength, the first spectrum signal and the second spectrum signal being generated by the spectrum signal generator.

12. The mobile device of claim 11, wherein the spectrum signal generator further comprises a spectral filter configured to filter the detection light for each wavelength, among a plurality of wavelengths.

13. The mobile device of claim 12, wherein the spectral filter is further configured to transmit therethrough light with a wavelength selected from a range from about 100 nm to about 840 nm.

14. The mobile device of claim 12, wherein the first wavelength and the second wavelength are determined based on the reference wavelength, a central wavelength, and a full width at half maximum, and
the spectral filter is further configured to transmit therethrough light with the first wavelength and the second wavelength.

15. The mobile device of claim 11, wherein the processor is further configured to select 400 nm as the reference wavelength.

16. The mobile device of claim 11, wherein the processor is further configured to detect the ultraviolet blocking material based on a change ratio of the second spectrum signal to the first spectrum signal.

17. The mobile device of claim 16, wherein the processor is further configured to determine that the ultraviolet blocking material is in the target object based on the change ratio of the second spectrum signal to the first spectrum signal being greater than a preset reference change ratio.

18. The mobile device of claim 11, wherein the processor is further configured to generate an RGB image by using the second spectrum signal.

19. The mobile device of claim 11, further comprising:
a light source configured to emit the detection light toward the target object.

20. The mobile device of claim 11, further comprising:
a display, wherein the processor is further configured to generate a hyperspectral image for detecting the ultraviolet blocking material based on the first spectrum signal and the second spectrum signal and control the display to output the hyperspectral image.

* * * * *